United States Patent
Nguyen et al.

(10) Patent No.: US 8,955,112 B2
(45) Date of Patent: Feb. 10, 2015

(54) DYNAMIC TRAFFIC ROUTING AND SERVICE MANAGEMENT CONTROLS FOR ON-DEMAND APPLICATION SERVICES

(75) Inventors: Han Nguyen, Marlboro, NJ (US);
Adrian Cepleanu, Belford, NJ (US);
Huajin Jeng, Middletown, NJ (US);
Thomas Spencer, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 367 days.

(21) Appl. No.: 13/212,220

(22) Filed: Aug. 18, 2011

(65) Prior Publication Data
US 2013/0044758 A1 Feb. 21, 2013

(51) Int. Cl.
*G06F 11/00* (2006.01)
*H04L 29/06* (2006.01)
*H04L 12/725* (2013.01)
*H04L 12/721* (2013.01)
*H04L 12/707* (2013.01)

(52) U.S. Cl.
CPC .......... *H04L 63/0272* (2013.01); *H04L 45/306* (2013.01); *H04L 63/1458* (2013.01); *H04L 45/38* (2013.01); *H04L 45/22* (2013.01)
USPC ............................................. 726/22; 726/23

(58) Field of Classification Search
USPC ...................................................... 726/22–23
See application file for complete search history.

(56) References Cited

U.S. PATENT DOCUMENTS

| | | | | |
|---|---|---|---|---|
| 7,062,782 B1 * | 6/2006 | Stone et al. | ...................... | 726/22 |
| 7,389,537 B1 * | 6/2008 | Callon et al. | ..................... | 726/22 |
| 7,409,712 B1 * | 8/2008 | Brooks et al. | ................... | 726/22 |
| 7,665,135 B1 * | 2/2010 | Mohiuddin et al. | ........... | 726/22 |
| 8,117,657 B1 * | 2/2012 | Elrod et al. | ...................... | 726/23 |
| 2002/0029276 A1 * | 3/2002 | Bendinelli et al. | ............ | 709/227 |
| 2002/0083175 A1 * | 6/2002 | Afek et al. | ..................... | 709/225 |
| 2004/0044912 A1 * | 3/2004 | Connary et al. | ............. | 713/201 |
| 2004/0148520 A1 * | 7/2004 | Talpade et al. | ................ | 713/201 |
| 2005/0125195 A1 * | 6/2005 | Brendel | ........................ | 702/182 |
| 2005/0180416 A1 * | 8/2005 | Jayawardena et al. | ........ | 370/389 |
| 2006/0031575 A1 * | 2/2006 | Jayawardena et al. | ........ | 709/239 |
| 2006/0050719 A1 * | 3/2006 | Barr et al. | ..................... | 370/401 |
| 2006/0153204 A1 * | 7/2006 | Wang et al. | ................... | 370/400 |
| 2006/0185014 A1 * | 8/2006 | Spatscheck et al. | ............ | 726/23 |
| 2006/0230444 A1 * | 10/2006 | Iloglu et al. | .................... | 726/14 |
| 2007/0214505 A1 * | 9/2007 | Stavrou et al. | .................. | 726/24 |
| 2008/0168559 A1 * | 7/2008 | Touitou et al. | .................. | 726/23 |
| 2008/0178278 A1 * | 7/2008 | Grinstein et al. | .............. | 726/12 |
| 2009/0327489 A1 * | 12/2009 | Swildens et al. | ............. | 709/224 |

* cited by examiner

*Primary Examiner* — Darren B Schwartz
(74) *Attorney, Agent, or Firm* — Hartman & Citrin LLC

(57) ABSTRACT

A network routing and service control design enables an internet protocol ("IP") network to effectively divert, on-demand, a given set of IP traffic flow from its normally followed network path to a network-attached application service processing complex and then enable the IP network to re-inject post-processed (e.g., Distributed Denial of Service scrubbed) traffic back into the network for routing to an originally-intended destination. This design also provides a sophisticated control mechanism for application service providers and/or customers/users for service management purposes. For example, application service providers can manage network and service processing resources and customers/users can manage their service requests.

18 Claims, 8 Drawing Sheets

DYNAMIC TRAFFIC ROUTING AND SERVICE MANAGEMENT CONTROLS FOR ON-DEMAND APPLICATION SERVICES

BACKGROUND

This application relates generally to network routing and service control and, more particularly, to dynamic traffic routing and service management controls for on-demand application services.

An increasingly important class of internet protocol ("IP") network application services includes services that, by nature, are dynamically invoked on-demand and selectively applied to a specified set of IP traffic flow. Examples of such services include, but are not limited to, scrubbing of Distributed Denial of Service ("DDoS") attack traffic, blocking of deemed offensive Web uniform resource locators ("URLs"), and remote monitoring and diagnosis of application protocol problems.

Current designs to support application services do not adapt well to the on-demand nature of these services and the dynamically shifting nature of targeted IP traffic flow. Moreover, these designs do not lend themselves to service control automation for operational scalability and cost-effectiveness.

It is with respect to these and other considerations that the disclosure made herein is presented.

SUMMARY

According to one aspect disclosed herein, a network routing and service control design enables an IP network to effectively divert, on-demand, a given set of IP traffic flow from its normally followed network path to a network-attached application service processing complex, such as a server complex including one or more servers configured to scrub DDoS attack traffic, enable the IP network to re-inject the post-processed flow back into the network, and route the post-processed flow to its originally-intended destination. This design also provides a sophisticated control mechanism for application service providers and/or customers/users for service management purposes. For example, application service providers can manage network and service processing resources and customers/users can manage their service requests.

According to another aspect disclosed herein, traffic flow redirection is separated into two distinct layers: a packet transport layer and a flow routing control layer. The packet transport layer a priori establishes and maintains logical network paths between appropriate ingress/egress network edges and one or more application service servers (e.g., residing at an application service processing complex) in the form of "tunnels" utilizing tunneling protocols such as Multiprotocol Label Switching ("MPLS") or Generic Routing Encapsulation ("GRE"). The flow routing layer provides a signaling mechanism to cause one or more network edge routers to redirect, on-demand, a given set of IP traffic flow onto a designated tunnel to/from selected application service servers.

According to yet another aspect, an intelligent application service controller processes on-demand application service requests and orchestrates traffic flow routing to optimize network and application service processing resources to distribute the targeted traffic volume evenly amongst the available processing complexes as service demand level and distribution vary, or to direct the targeted traffic at a particular subset of application processing nodes that are equipped with processing capabilities most suitable to the given targeted traffic.

The layered network design disclosed herein enables very fine grain selection of targeted traffic flow. For example, traffic flows that match a given tuple of {source/destination IP addresses, source/destination Transfer Control Protocol ("TCP")/Uniform Data Protocol ("UDP") ports, protocol ID} may be selected rather than merely {destination IP addresses} as in current designs. This greatly enhances an application service's effectiveness. Moreover, this design enables an application service to make cost-effective use of the network and application processing resources, and to operationally and profitably scale as demand for the application service increases.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is generally directed to a network routing and service control design that enables an IP network to effectively divert, on-demand, a given set of IP traffic flow from its normally followed network path to a network-attached application service processing complex, such as a server complex including one or more servers configured to scrub DDoS attack traffic or perform some other application service, enable the IP network to re-inject the post-processed flow back into the network, and route the post-processed flow to its originally-intended destination. The disclosed design also provides a sophisticated control mechanism for application service providers and/or customers/users for service management purposes. For example, application service providers can manage network and service processing resources and customers/users can manage their service requests.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, microprocessor-based or programmable consumer electronics, minicomputers, mainframe computers, routers, switches, and the like.

Figure 1:
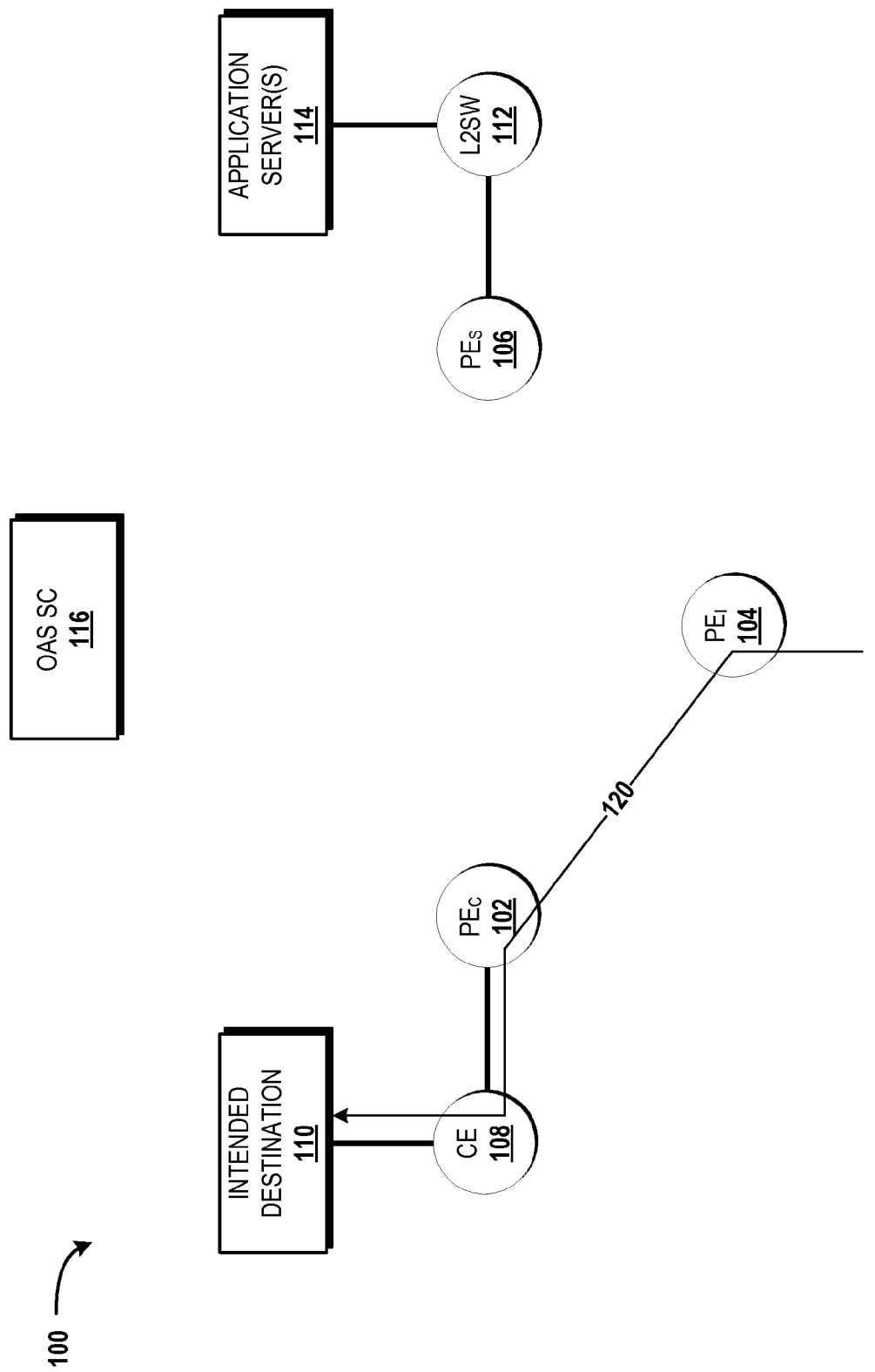
FIG. 1 is a diagram schematically illustrating a network for providing on-demand application services and a routing overview for routing normal traffic flow within the network, according to an exemplary embodiment.

Referring now to FIG. 1, a network 100 for providing on-demand application services and a routing overview for routing normal traffic flow within the network 100 will be described. On-demand application services include, but are not limited to, DDoS mitigation services such as black-holing attack traffic and scrubbing attack traffic, content filtering such as URL blocking, and remote application/network protocol monitoring and diagnosis. Those skilled in the art will appreciate the applicability of various aspects disclosed herein to other application services.

FIG. 1 illustrates components of a simplified IP network including Network Service Provider ("NSP"), customer premises ("CP"), and Application Service Provider ("ASP") level components. The NSP-level components in the illustrated network 100 include provider edge ("PE") routers, specifically, a PE-customer router ("$PE_C$") router 102, a PE-ingress ("$PE_I$") router 104, and a PE-application service ("$PE_S$") router 106. The CP-level components in the illustrated network 100 include a customer edge ("CE") router 108 and an intended destination 110. The ASP-level components in the illustrated network 100 include a layer two switch ("L2SW") 112, one or more application servers 114, and an on-demand application service controller ("OAS SC") 116. It should be understood that the $PE_C$ router 102, the $PE_I$ router 104, and the $PE_S$ router 106 are meant to connote distinct functional roles/behaviors of a PE in effecting traffic routing for on-demand services, simply for ease and clarity in describing the illustrated network 100; in reality a network PE can and is likely to assume more than one of these three functional roles.

Generally, the PE routers 102, 104, 106 are routers located at an NSP's network edge and are connected to other routers or switches within the network 100. When a customer has not requested an application service from the application server 114, the $PE_I$ router 104 is configured to receive ingress IP traffic 120 and route the ingress IP traffic 120 to the $PE_C$ router 102. This is referred to herein as a normal traffic flow. It should be understood that normal traffic flow may be more broadly defined as traffic flow that is not diverted to the application server 114 for processing (e.g., DDoS scrubbing or processing in accordance with another application service). The $PE_C$ router 102 is configured to receive the ingress IP traffic 120 from the $PE_I$ router 104 and route the ingress IP traffic 120 to the CE 108 for delivery to the intended destination 110.

The CE router 108 is a router located at a customer premises and provides an interface (e.g., an Ethernet interface or the like) between the intended destination 110 and a NSPs network, particularly, via the $PE_C$ 102. For normal traffic flow, the CE router 108 is configured to receive the ingress IP traffic 120 from the $PE_C$ router 102 and provide the ingress IP traffic 120 to the intended destination 110. The intended destination 110 may be, for example, a customer's local area network ("LAN") or any device connected thereto including, but not limited to, one or more LAN routers, wireless LAN routers, or other IP devices such as computers, servers, video game consoles, or mobile devices (e.g., a smartphone, personal digital assistant, tablet computer, camera, or e-reader).

Figure 2:
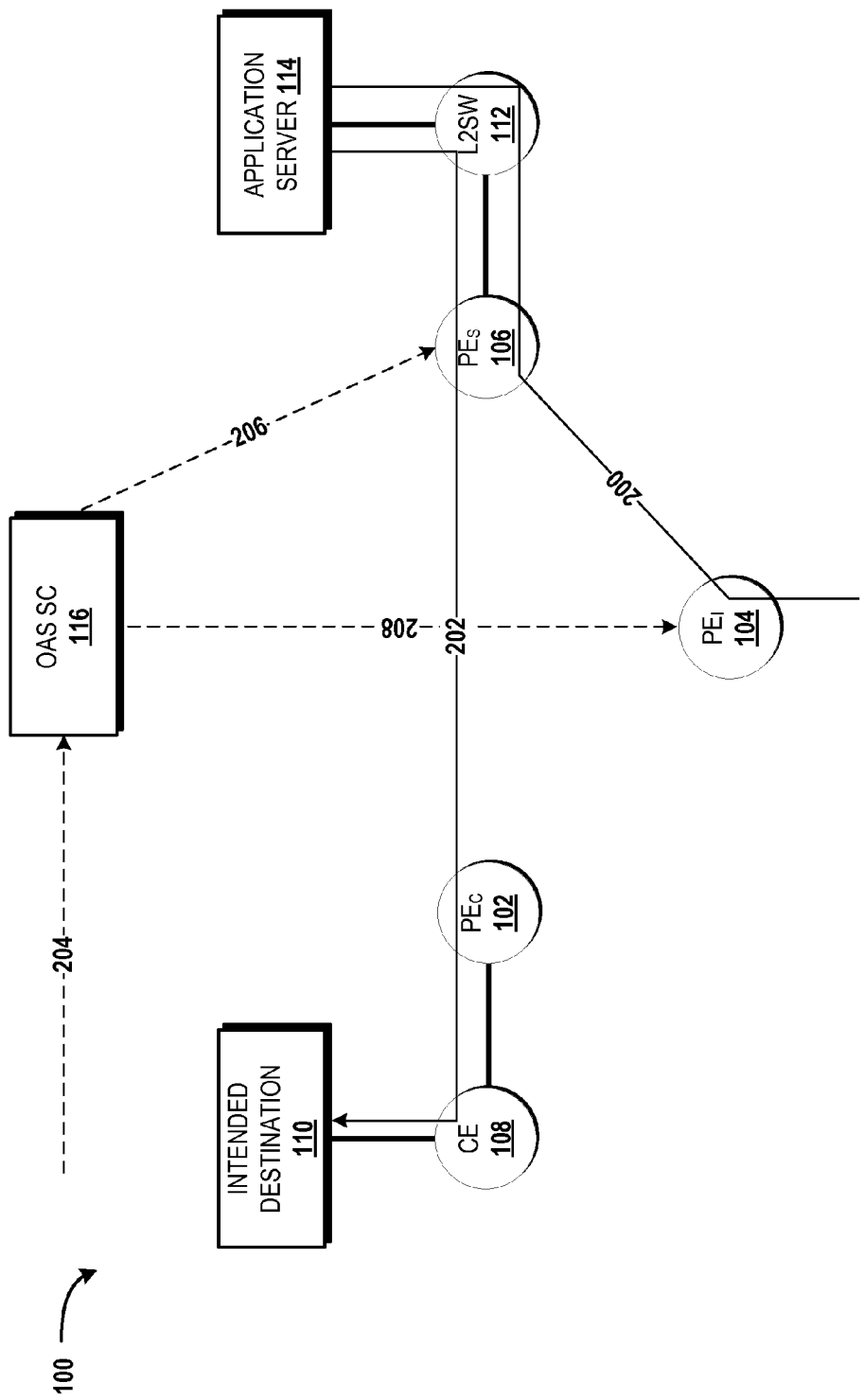
FIG. 2 is a diagram schematically illustrating a network for providing on-demand application services and a routing overview for routing redirected traffic flow within the network, according to an exemplary embodiment.

Turning now to FIG. 2, the network 100 for providing on-demand application services and a routing overview for routing redirected traffic flow within the network 100 will be described. The $PE_I$ router 104 is configured to redirect ingress IP traffic 200 (hereinafter "redirected ingress IP traffic 200") to the $PE_S$ router 106 in response to a customer requesting an application service from the application server 114. The $PE_S$ router 106 is configured to receive the redirected ingress IP traffic 200 from the $PE_I$ router 104 and route the redirected ingress IP traffic 200 to the L2SW 112. The L2SW 112 is configured to receive redirected ingress IP traffic 200 from the $PE_I$ router 104 and provide the redirected ingress IP traffic 200 to the application server 114 for processing (e.g., via DDoS scrubbing or another application service). The application server 114 processes the redirected ingress IP traffic 200 and sends post-processed traffic 202 to the L2SW 112, which provides the post-processed traffic 202 to the $PE_S$ router 106 for routing to the $PE_S$ router 102. The $PE_S$ router 102 receives the post-processed traffic 202 and then routes the post-processed traffic 202 to the CE router 108 for delivery to the intended destination 110.

In FIG. 2, the network 100 redirects traffic flow in response to the OAS SC 116 receiving an on-demand service request 204. In some embodiments, the on-demand service request 204 includes a request to initiate an instance of an on-demand service to which a user/customer is subscribed. For example, a customer may subscribe to a DDoS scrubbing service and may be permitted to initiate an instance of the DDoS scrubbing service as a feature of their subscription. It is contemplated that the actual subscription may include provisioning of an application service for future on-demand service requests and may or may not be accompanied by a subscription fee. It is also contemplated that a customer may or may not be charged for each instance of the application service. In some embodiments, the on-demand service request 204 is not associated with a subscription and may be provided in accordance with a pay-as-you-go service model.

In response to receiving the on-demand service request 204, the OAS SC 116 generates a re-injection routing control message 206 and sends the re-injection routing control message 206 to the $PE_S$ router 106. The re-injection routing control message 206 instructs the $PE_S$ router 106 to deliver the post-processed traffic 202 back to the intended destination 110 after the application server 114 processes the redirected ingress IP traffic 200 in accordance with the on-demand application service requested by the customer. In some embodiments, the OAS SC 116 is configured to monitor traffic flow towards the intended destination 110, detect attack traffic, and, in response thereto, generate the re-injection routing control message 206.

Further in response to receiving the on-demand service request 204, the OAS SC 116 generates a diversion routing control message 208 and sends the diversion routing control message 208 to the $PE_I$ router 104. The diversion routing control message 208 instructs the $PE_I$ router 104 to divert ingress traffic from the normal traffic flow to the $PE_C$ router 102, as described above with reference to FIG. 1, to the redirected traffic flow to the $PE_S$ router 106, as described above.

Combined diversion and re-injection is particularly useful for DDoS attacks. For such attacks, and at the instruction of the OAS SC 116 as received in the diversion routing control message 208, the $PE_I$ router 104 routes the redirected ingress IP traffic 200 to a DDoS scrubber (e.g., implemented by the application server 114). The DDoS scrubber then determines which packets in the redirected ingress IP traffic 200 are attack packets and which packets are legit packets (i.e., non-attack or normal packets). Although all traffic is diverted to the DDoS scrubber, only legit packets are then re-injected into the traffic flow of the network 100 by the $PE_S$ 106 as the post-processed traffic 202.

It should be understood that not all application services benefit from or require re-injection. As such, in some embodiments, such as for URL blocking, the OAS SC 116 forgoes generating a re-injection routing control message 206 and only generates a diversion routing control message 208. URL blocking may be utilized for situations wherein safe content and forbidden (blocked) content are hosted on the same server. In these situations, the IP address of the host server is determined and all traffic is diverted to a URL scrubber (e.g., implemented by the application server 114). The URL scrubber then examines the payload of each packet to determine if the packet includes forbidden content or safe content. Packets containing forbidden content are discarded and packets containing safe content are placed back into the traffic flow with normal routing treatment.

It should be understood that some implementations of the network 100 include multiple $PE_C$ routers 102, multiple $PE_I$ routers 104, multiple $PE_S$ routers 106, multiple CE routers 108, multiple intended destinations 110, multiple L2SWs 112, multiple application servers 114, and/or multiple OAS SCs 116. Thus, the illustrated embodiments of the network 100 should be understood as being exemplary, and should not be construed as being limiting in any way.

Traffic flow redirection is separated into two distinct layers: a packet transport layer and a flow routing control layer. The packet transport layer a priori establishes and maintains logical network paths between appropriate ingress/egress network edges and one or more application service servers (e.g., residing at an application service processing complex) in the form of "tunnels" utilizing tunneling protocols such as MPLS (e.g., for "on-net" scenarios) or GRE (e.g., for "off-net" scenarios). Other encapsulation/tunneling methods are contemplated. The paths established by the packet transport layer are relatively invariant, although the effected prefix of a particular network node may vary. The packet transport layer is independently maintainable thereby facilitating service preparedness testing. The flow routing control layer is configured to manage changing traffic flow of targeted ingress traffic. The flow routing layer provides a signaling mechanism to cause one or more network edge routers to redirect, on-demand, a given set of IP traffic flow onto a designated tunnel to/from selected application service servers.

Figure 3:
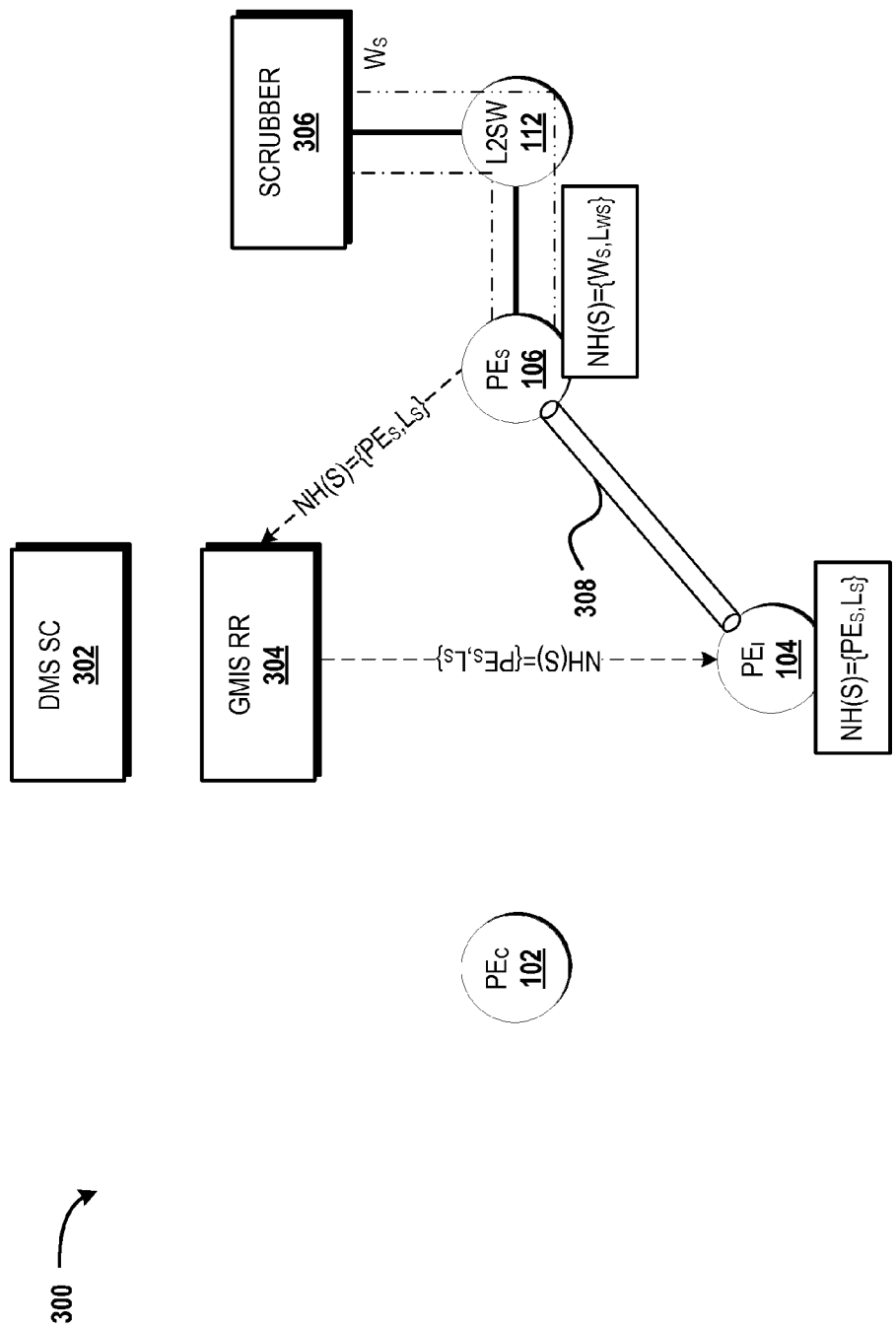
FIG. 3 is a diagram schematically illustrating a network for providing a DDoS mitigation service and scrubber provisioning within the network, according to an exemplary embodiment.

Turning now to FIG. 3, a network 300 for providing a DDoS mitigation service and scrubber provisioning within the network 300 will be described. The network 300 includes the $PE_C$ router 102, the $PE_I$ router 104, the $PE_S$ router 106, and the L2SW 112, as described in detail above with reference to FIGS. 1 and 2. The network 300 also includes a DDoS mitigation service controller ("DMS SC") 302, which is the similar to the OAS SC 116 described above, but is configured particularly for implementing a DDOS mitigation service provided by one or more scrubbers 306. A global managed internet service ("GMIS") route reflector ("RR") 304 is also illustrated and is configured to reflect (forward) routing instructions received by an edge router to one or more other edge routers, as will be described in detail below.

In the illustrated embodiment, the $PE_S$ router 106 is configured with a routing announcement NH(S)={$W_S$, $L_{WS}$}. This routing announcement indicates that if the next hop "NH" for a given IP packet is the scrubber 306 (further abbreviated for convenience as "S"), the $PE_S$ router 106 directs the IP packet to the IP address $W_S$ (representing the IP address of the WAN link via which the Scrubber is attached to the $PE_S$ router 106) utilizing the MPLS label $L_{WS}$. As a result of this routing entry, the $PE_S$ router 106 now knows how to direct packets to the scrubber 306 and, in turn, instructs the GMIS RR 304 to announce the $PE_S$ router 106 as the next-hop and the MPLS binding label $L_S$ for packets directed to the scrubber 306 utilizing the routing announcement NH(S)={$PE_S$, $L_S$}. The GMIS RR 304 receives the routing announcement NH(S)={$PE_S$, $L_S$} from the PEs 106 and reflects it to other edge routers. In the illustrated embodiment, the GMIS RR 304 reflects it to the $PE_I$ 104. The $PE_I$ 104 now knows to redirect ingress IP traffic to the scrubber 306 toward the $PE_S$ 106 utilizing the routing announcement NH(S)={$PE_S$, $L_S$} via a tunnel 308, if the $PE_S$ 106 is instructed to redirect traffic by the DMS SC 302 in response to the DMS SC 302 receiving an on-demand service request (e.g., the on-demand service request 204) from a customer for a DDoS mitigation service or the DMS SC 302 otherwise detecting or receiving notification of detected DDoS attack traffic.

Figure 4:
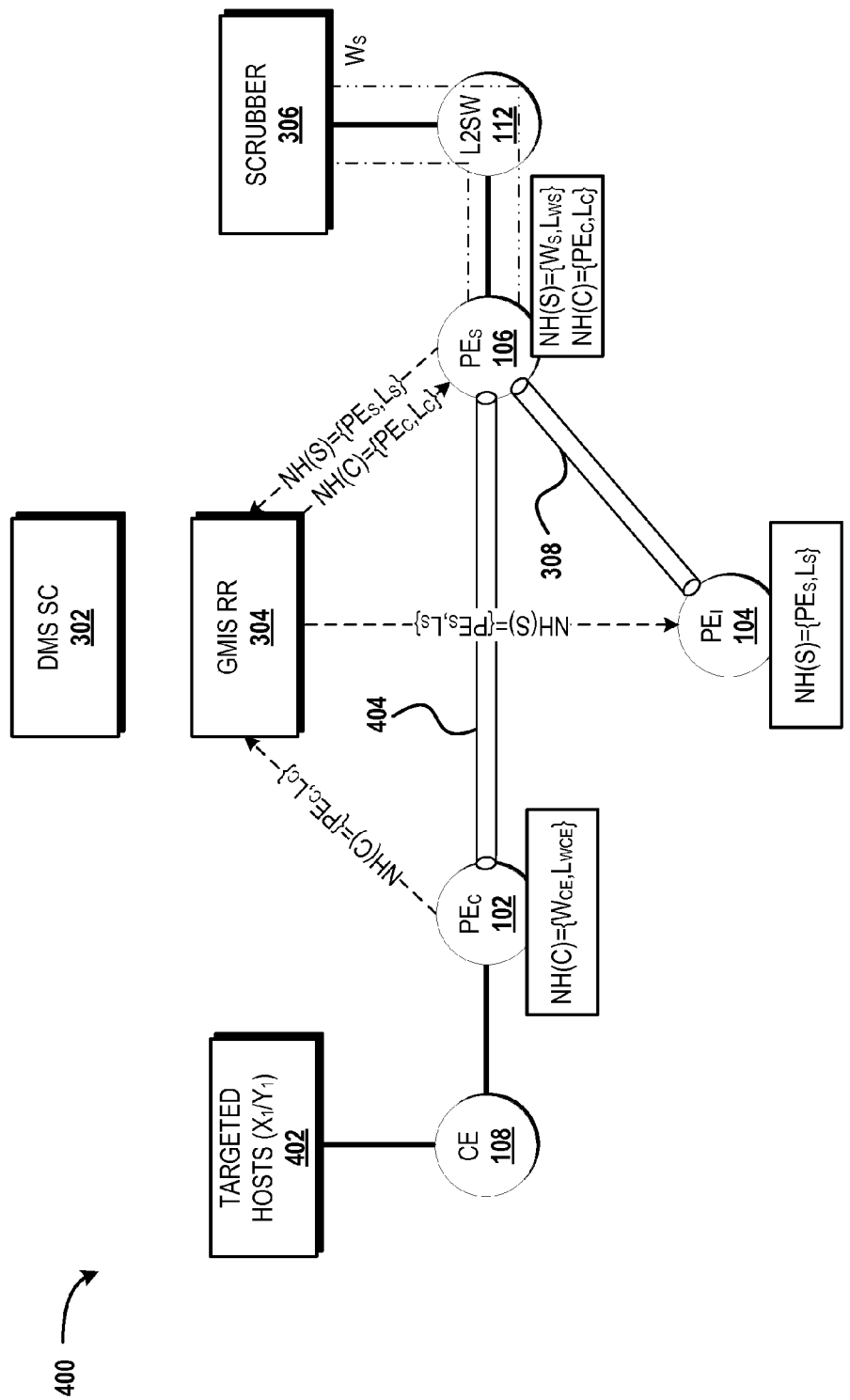
FIG. 4 is a diagram schematically illustrating a network for providing a DDoS mitigation service and customer provisioning for an on-net site, according to an exemplary embodiment.

Turning now to FIG. 4, a network 400 providing a DDoS mitigation service and customer provisioning for an on-net site will be described. Customer provisioning is a packet control layer function. The network 400 includes the $PE_C$ router 102, the $PE_I$ router 104, the $PE_S$ router 106, the CE router 108, and the L2SW 112, as described in detail above with reference to FIGS. 1-2. The network 300 also includes the DMS SC 302, the scrubber 306, and the GMIS RR 304, as described above with reference to FIG. 3. An intended destination of targeted hosts 402 is also illustrated.

As described above, a customer may subscribe to an on-demand DDoS mitigation service so that the customer can invoke an instance of DDoS scrubbing in response, for example, to a suspected DDoS attack. To effectively route processed traffic to a customer premises in which the targeted hosts 402 reside, a tunnel 404 needs to be created to support traffic flow from the scrubber 306 to the customer premises by way of the $PE_C$ 102. In the illustrated embodiment, the $PE_C$ router 102 is configured with a routing announcement NH(C)={$W_{CE}$, $L_{WCE}$}. This routing announcement indicates that if the NH for a given IP packet is the CE router 108 (further abbreviated here as "C"), the $PE_C$ router 102 directs the IP packet to the IP address $W_{CE}$ (the IP address of the WAN link to Customer Equipment) utilizing the MPLS label $L_{WCE}$. The $PE_C$ router 102 now knows how to direct packets to the CE router 108 and, in turn, instructs the GMIS RR 304 to announce itself as the next-hop and the MPLS label binding $L_C$ for packets directed to the CE router 108 utilizing the routing announcement NH(C)={$PE_C$, $L_C$}. The GMIS RR 304 receives the routing announcement NH(C)={$PE_C$, $L_C$} from the $PE_C$ 102 and reflects it to the $PE_S$ 106. As a result, the $PE_S$ 106 includes the routing announcement NH(C)={$PE_C$, $L_C$} in its routing table and now knows to direct processed traffic that is directed to the targeted hosts 402 toward the $PE_C$ 102 utilizing the routing announcement NH(C)={$PE_C$, $L_C$} via the tunnel 404.

The aforementioned customer provisioning scenario is for customers that are directed attached to the serving NSP's network and utilizes MPLS tunneling. This is also referred to herein as "on-net". In some scenarios, the customer may instead be attached to a competing NSP's network or another network with which MPLS tunneling is not shared between the networks. As a result, MPLS tunneling cannot be used to create the tunnel 404 from the scrubber 306 to the $PE_C$ 102 to provision the customer. For these scenarios, GRE-based tunneling is utilized, as will now be described in detail with reference to FIG. 5.

Figure 5:
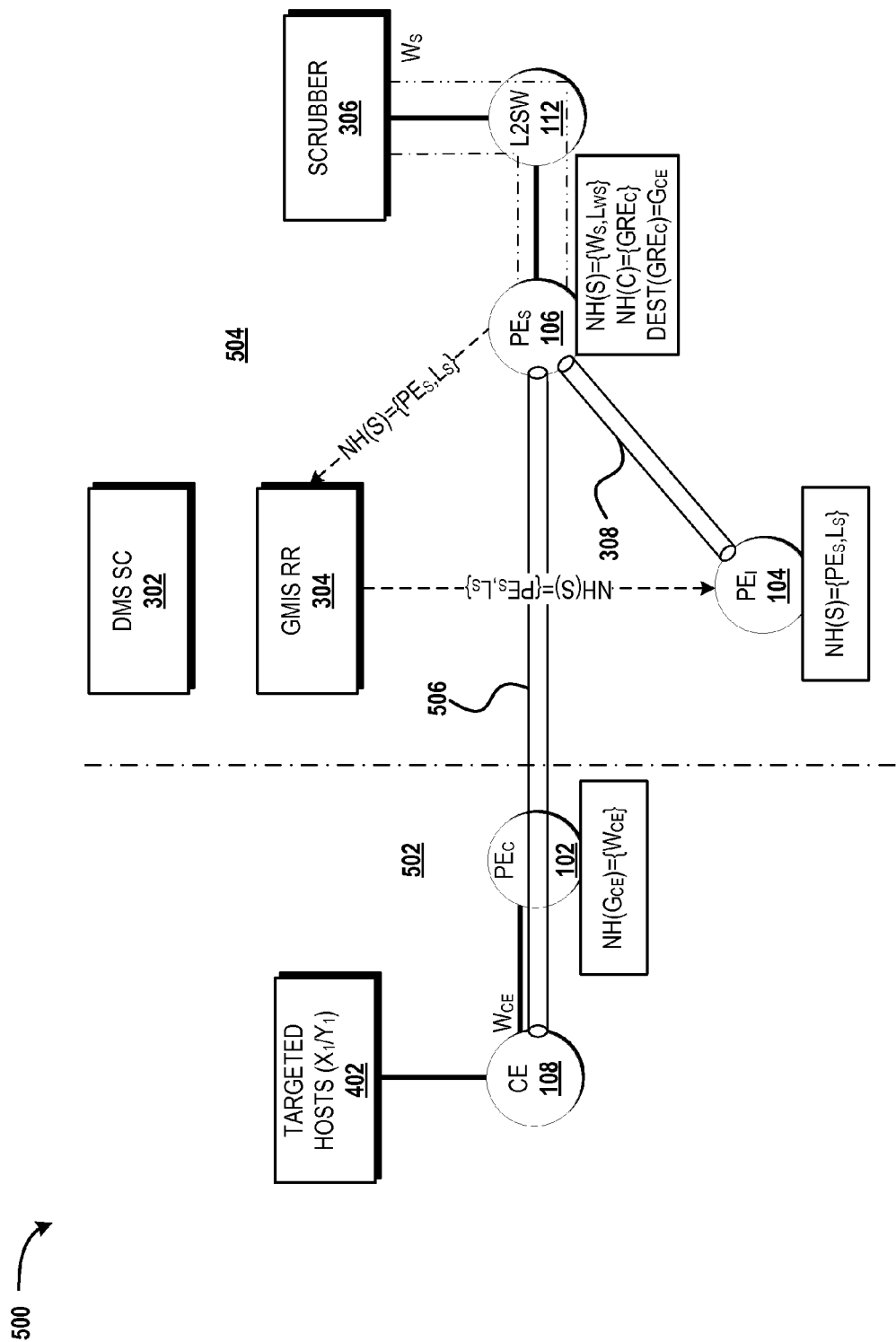
FIG. 5 is a diagram schematically illustrating a network for providing a DDoS mitigation service and customer provisioning for an off-net site, according to an exemplary embodiment.

Turning now to FIG. 5, a network 500 for providing a DDoS mitigation service and customer provisioning for an off-net site will be described. The network 500 includes a customer premises network 502 and a serving NSP network 504. The customer premises network 502 is not directly attached to the serving NSP network 504 and thus the targeted hosts 402 are referred to herein as being "off-net." In the illustrated embodiment, it is assumed that the serving NSP network 504 and the network to which the customer premises network 502 is attached do not share MPLS tunneling. In some embodiments, however, MPLS tunneling may be shared and customer provisioning is performed in accordance with the procedure described above with respect to FIG. 4.

In the illustrated embodiment, a GRE tunnel 506 with a label $GRE_C$ is created between the $PE_S$ router 106 and the CE router 108. The $PE_S$ router 106 is configured with a routing announcement NH(C)={$GRE_C$}. This routing announcement indicates that if the next hop for a given IP packet is the GRE tunnel 506, the $PE_S$ router 106 directs the IP packet to the GRE tunnel 506 utilizing the address $G_{CE}$, which is defined in the $PE_S$ router's 106 routing table as DEST($GRE_C$)=$G_{CE}$. The $PE_S$ router 106 now knows to direct packets to the GRE tunnel 506 via the address $G_{CE}$ for delivery to the CE router 108.

Figure 6:
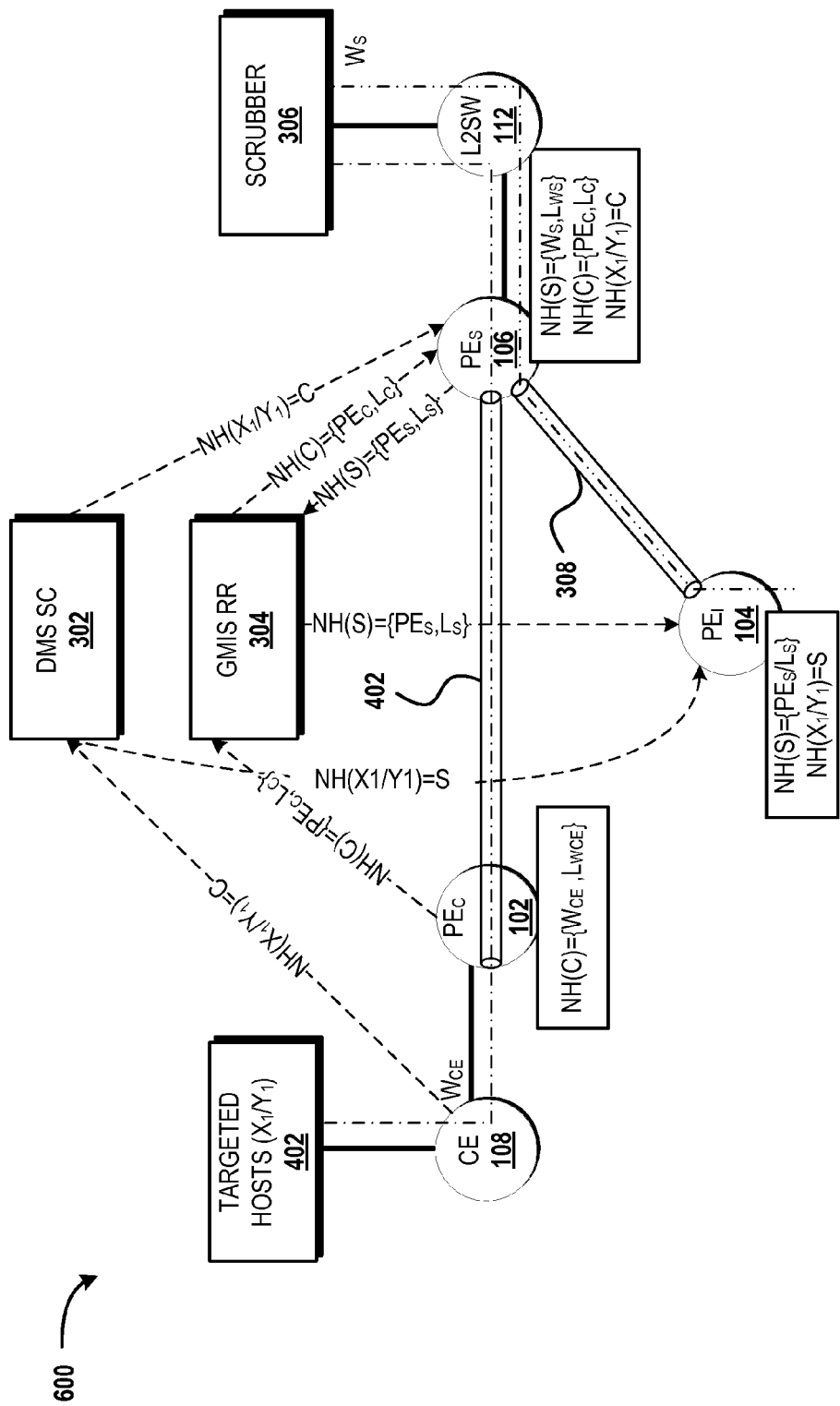
FIG. 6 is a diagram schematically illustrating a network for providing a DDoS mitigation service and flow routing control for an on-net site, according to an exemplary embodiment.

Turning now to FIG. 6, a network 600 for providing a DDoS mitigation service and flow routing control for an on-net site will be described. The network 600 includes the $PE_C$ router 102, the $PE_I$ router 104, the $PE_S$ router 106, the CE router 108, and the L2SW 112, as described in detail above with reference to FIGS. 1-2. The network 600 also includes the DMS SC 302, the scrubber 306, and the GMIS RR 304, as described above with reference to FIG. 3. An intended destination of the targeted hosts 402 is also illustrated.

In the illustrated embodiment, the targeted hosts 402 have suffered a DDoS attack and, in response, the CE router 108 generates an on-demand service request identified as NH($X_1$/$Y_1$)=C and sends the request to the DMS SC 302. In response to receiving the request, the DMS SC 302 translates the request into two primitives, a first of which, NH($X_1$/$Y_1$)=S, is directed to the $PE_I$ 104 to indicate that the next hop for incoming traffic directed to the targeted hosts 402 should be diverted to the scrubber 306 for DDoS scrubbing; and, a second of which, NH($X_1$/$Y_1$)=C, is directed to the $PE_S$ router 106 to instruct the $PE_S$ router 106 that any traffic directed to the targeted hosts 402 needs to go to the CE router 108. The first primitive is akin to the diversion routing control message 208 and the second primitive is akin to the re-injection routing control message 206, both of which are described above with reference to FIG. 2. The other routing entries and messages associated therewith, as described above, are shown for completeness and are not described again here.

Figure 7:
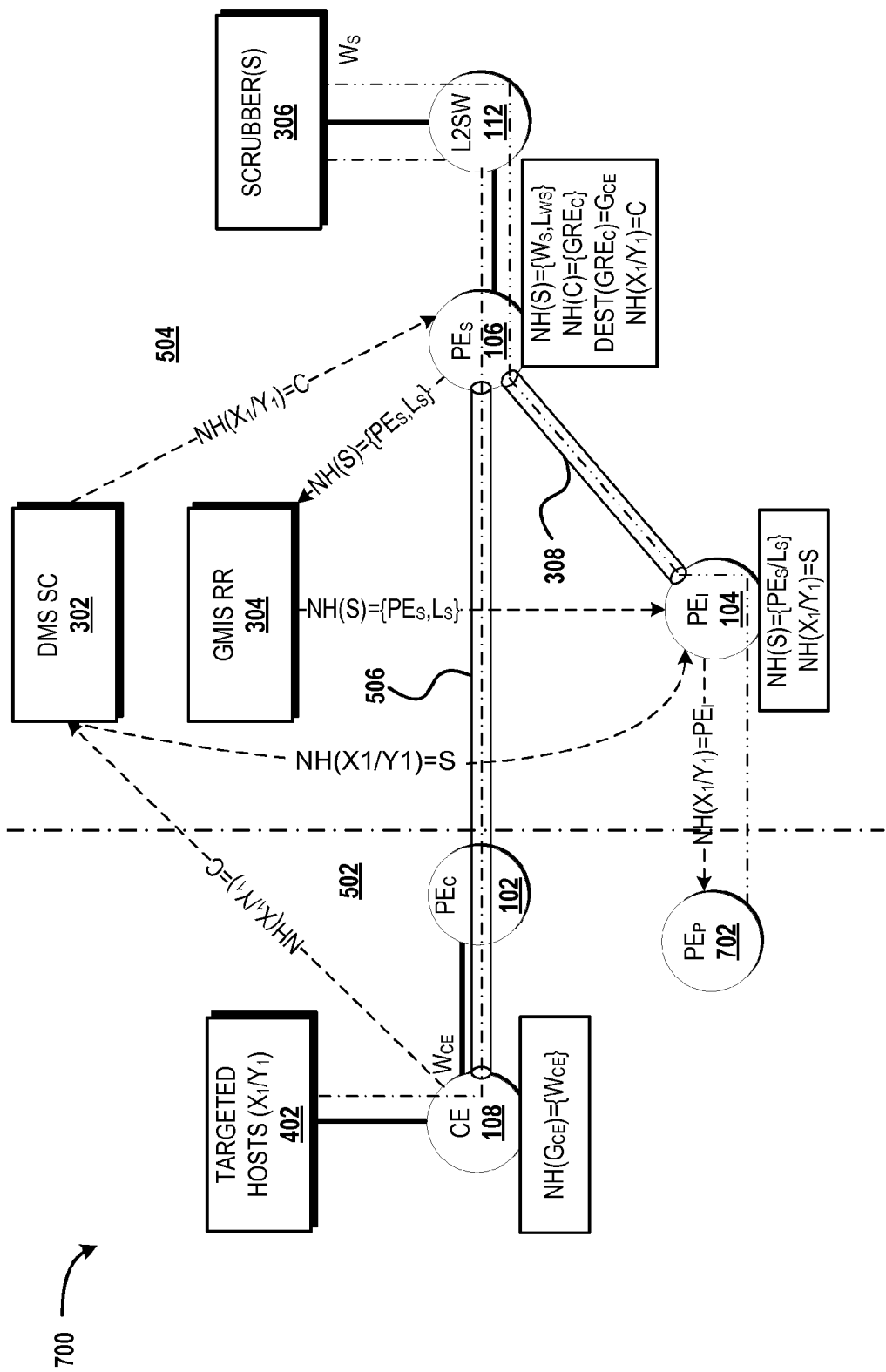
FIG. 7 is a diagram schematically illustrating a network providing a DDoS mitigation service and flow routing control for an off-net site, according to an exemplary embodiment.

Turning now to FIG. 7, a network 700 for providing a DDoS mitigation service and flow routing control for an off-net site will be described. The network 700 includes the $PE_C$ router 102, the $PE_I$ router 104, the $PE_S$ router 106, the CE router 108, and the L2SW 112, as described in detail above with reference to FIGS. 1-2. The network 600 also includes the DMS SC 302, the scrubber 306, and the GMIS RR 304, as described above with reference to FIG. 3. Also illustrated are an intended destination of the targeted hosts 402 and a $PE_P$ 702, which is a border PE in the other ISP network with which the $PE_I$ router 104 peers.

In the illustrated embodiment, the GRE tunnel 506 with a label $GRE_C$ has been created (e.g., via provisioning in FIG. 5) between the $PE_S$ router 106 and the CE router 108. The $PE_S$ router 106 is configured with a routing announcement NH(C)={$GRE_C$}. This routing announcement indicates that if the next hop for a given IP packet destined to CE 108 is the GRE tunnel 506, the $PE_S$ router 106 directs the IP packet to the GRE tunnel 506 utilizing the address $G_{CE}$, which is defined in the $PE_S$ router's 106 routing table as DEST($GRE_C$)=$G_{CE}$. The PEs router 106 now knows to direct packets to the GRE tunnel 506 via the address $G_{CE}$ for delivery to the CE router 108.

Moreover, in the illustrated embodiment, the targeted hosts 402 have suffered a DDoS attack and, in response, the CE router 108 generates an on-demand service request identified as NH($X_1$/$Y_1$)=C and sends the request to the DMS SC 302. In response to receiving the request, the DMS SC 302 translates the request into two primitives, a first of which, NH($X_1$/$Y_1$)=S, is directed to the $PE_I$ 104 to indicate that the next hop for incoming traffic directed to the targeted hosts 402 should be diverted to the scrubber 306 for DDoS scrubbing; and, a second of which, NH($X_1$/$Y_1$)=C, is directed to the $PE_S$ router 106 to instruct the $PE_S$ router 106 that any traffic directed to the targeted hosts 402 needs to go to the CE router 108. The first primitive is akin to the diversion routing control message 208 and the second primitive is akin to the re-injection routing control message 206, both of which are described above with reference to FIG. 2. In addition to installing the routing announcement NH($X_1$/$Y_1$)=S, the $PE_I$ 104 also announces to the $PE_P$ 702 itself as the next hop for the prefix under attack $X_1$/$Y_1$.

Figure 8:
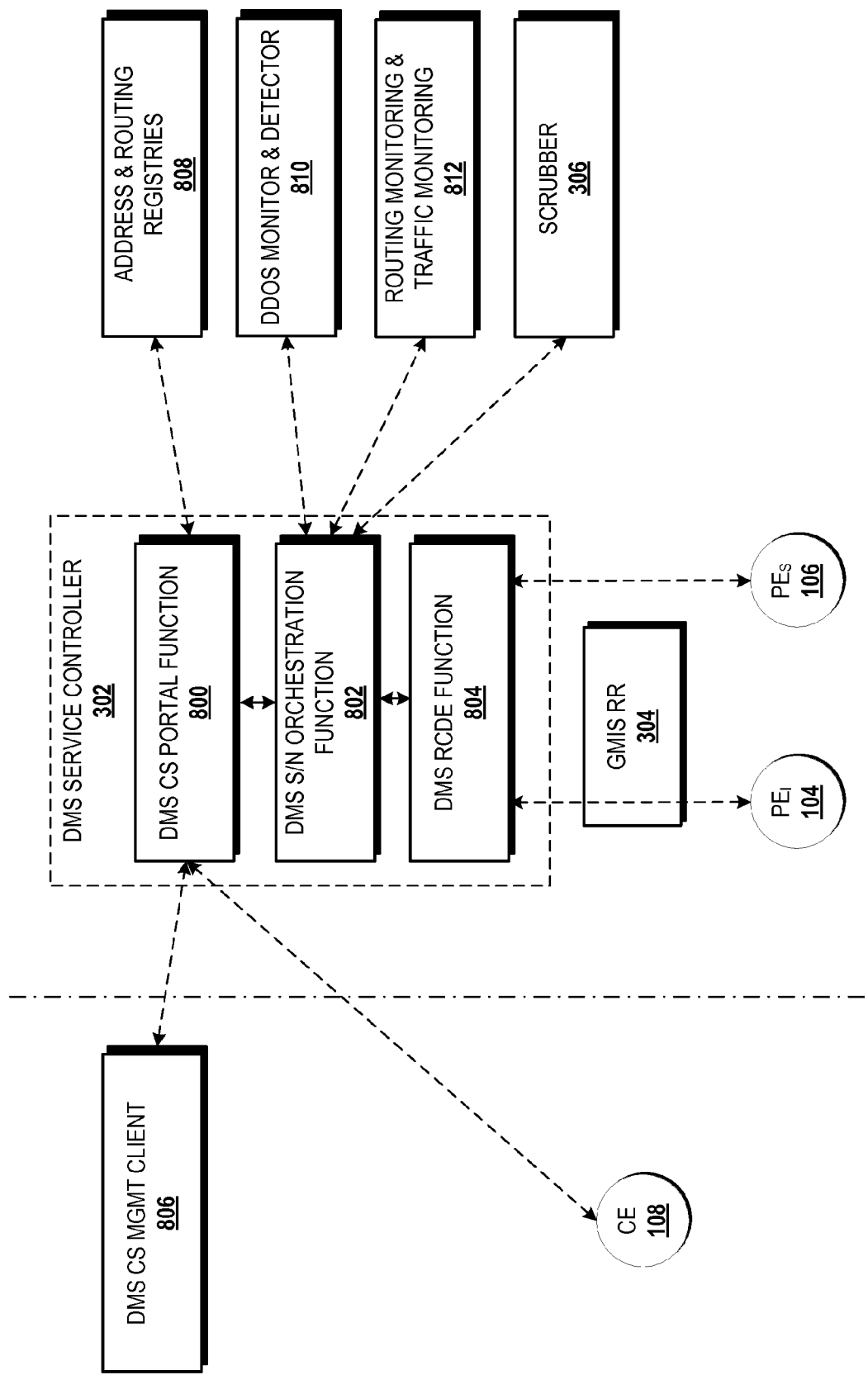
FIG. 8 is a diagram illustrating a DDoS mitigation service controller and components thereof, according to an exemplary embodiment.

Turning now to FIG. 8, an exemplary DMS SC 302 and components thereof will be described. The DMS SC 302 is capable of executing software components described herein with regard to receiving and responding to on-demand service requests for DDoS mitigation services. The software components may be stored in a computer storage media including, but not limited to, volatile and non-volatile, removable and non-removable media implemented in any method or technology for storage of information such as computer-readable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the DMS SC 302. For purposes of the claims, the phrase "computer storage medium" and variations thereof, does not include waves, signals, and/or other transitory and/or intangible communication media, per se.

It should be appreciated that the software components described herein may, when loaded into a processor of the DMS SC 302 and executed, transform the processor and the overall DMS SC 302 into a special-purpose computing system customized to facilitate the functionality presented herein. Such a processor may be constructed from any number of transistors or other discrete circuit elements, which may individually or collectively assume any number of states. More specifically, the processor may operate as a finite-state machine, in response to executable instructions contained within the software modules disclosed herein. These computer-executable instructions may transform the processor by specifying how the processor transitions between states, thereby transforming the transistors or other discrete hardware elements constituting the processor.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

The DMS SC 302 includes a DMS customer service ("CS") portal function 800, a DMS service and network orchestration function 802, and a DMS routing control distribution engine ("RCDE") function 804. These functions may be included in one or more software modules that are executable by a processor of the DMS SC 302. The DMS CS portal function 800 is now described.

The DMS CS portal function 800 is configured to provide an interface through which customers can interact with the DMS SC 302 to, for example, subscribe to a DDoS mitigation service, modify subscription settings, and submit service requests. The DMS CS portal function 800 is also configured to provide specifications and updates for traffic routing policies for purposes of injection routing control. Moreover, the DMS CS portal function 800 is configured to start and stop DDoS mitigation service and/or tune the DDoS mitigation service at the direction of a customer or based upon predefined settings.

The DMS CS portal function 800 is responsive to a service control primitive defined as {prefix/flow-spec, point-of-delivery, control action}, in which "prefix/flow-spec" specifies the targeted flow, "point-of-delivery" specifies the intended destination, and the "control-action" specifies the desired service action (e.g., scrubbed, dropped, etc.)) provided by a DMS CS management client 806 or the CE router 108. The DMS CS management client 806 or the CE router 108 may provide a service control primitive to the DMS CS portal function 800 using, for example, multi-hop external border gateway protocol ("eBGP"), a web-based graphical user interface ("GUI"), or a client/server networked application programming interface ("API"). It is contemplated that authentication mechanisms may be used to authenticate a customer for secure interactions with the DMS CS portal function 800. It is also contemplated that the DMS CS portal function 800 may provide feedback to the DMS CS management client 806 and/or the CE router 108 in response to service requests or other interactions.

The DMS CS management client 806 is also configured to facilitate customer sign-up for DDoS mitigation service. The DMS CS portal function 800, in some embodiments, prompts a customer to provide site information, which is then used by the DMS CS portal function 800 to check the site prefix against an address and routing registry 808 to validate the customer owns or is an administrator of the site. If the customer is validated, the DDoS mitigation service subscription can be initiated. Otherwise, the DDoS CS portal function 800 may inform the customer that no further action can be taken.

A subscription can be configured for manual or automatic detection of DDoS attack activity. For example, a basic subscription may rely upon customer notification of DDoS attack activity via service requests (service control primitives) to the DMS CS portal function 800. Alternatively, for example, a premium subscription may provide for DDoS attack traffic monitoring and detection via a DDoS monitor and detector 810. The DMS service and network orchestration function 802 is configured to receive input from the DDoS monitor and detector 810 and instruct the DMS RCDE function 804 to generate and send routing control primitives to the PE$_S$ 106 and the PE$_I$ 104 (e.g., a re-injection routing control message and a diversion routing control message, respectively).

The DMS service and network orchestration function 802 is also configured to communicate with a routing monitoring and traffic monitoring function 812 to receive network routing status and traffic distribution information. The DMS service and network orchestration function 802 also communicates with the scrubber 306 (or multiple scrubbers, not shown) to monitor load and provide tuning control when needed, for example, to off-load DDoS scrubbing activity to other scrubbers for load-balancing.

The DMS RCDE function 804 is configured to receive instructions to initiate DDoS mitigation service from the DMS service and network orchestration function 802, translate these instructions into the routing protocol primitives, and direct the routing protocol primitives to the PE$_S$ 106 and the PE$_I$ 104.

Based on the foregoing, it should be appreciated that technologies for dynamic traffic routing and service management controls for on-demand application services have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A network system for dynamic routing of internet protocol traffic, the network system comprising:
   an on-demand application service controller configured to
      receive an on-demand service request for an application service, wherein the application service comprises a distributed denial of service mitigation service and the on-demand service request is received in response to a distributed denial of service attack,
      generate a validation request in response to receiving the on-demand service request, the validation request being used to validate a customer that provided the on-demand service request is responsible for a site for which the application service has been requested,
      generate a diversion routing control message in response to receiving the on-demand service request for the application service, the diversion routing control message comprising instructions for an ingress provider edge router to divert ingress traffic from an intended destination to a distributed denial of service attack scrubber, implemented by an application server, for processing,
      generate a re-injection routing control message in response to receiving the on-demand service request for the application service, the re-injection routing control message comprising instructions for an application service provider edge router to deliver the ingress traffic processed by the distributed denial of service attack scrubber to the intended destination,
      send the diversion routing control message to the ingress provider edge router, and
      send the re-injection routing control message to the application service provider edge router;
   the ingress provider edge router being configured to
      receive the diversion routing control message from the on-demand application service controller,
      receive the ingress traffic directed to the intended destination, and
      redirect the ingress traffic in accordance with the diversion routing control message to the application service provider edge router; and
   the application service provider edge router being configured to
      route the ingress traffic to the distributed denial of service attack scrubber implemented by the application server.

2. The network system of claim 1, wherein:
   the application service provider edge router is further configured to
      receive the re-injection routing control message from the on-demand application service controller, and
      deliver the ingress traffic processed by the distributed denial of service attack scrubber to the intended destination.

3. The network system of claim 2, wherein the application service provider edge router in being configured to route the ingress traffic processed by the distributed denial of service attack scrubber to the intended destination is configured to route the ingress traffic processed by the distributed denial of service attack scrubber to a customer provider edge router that is in communication with a customer equipment serving the intended destination.

4. The network system of claim 1, wherein the application service is a uniform resource locator blocking service and the application server is a uniform resource locator scrubber.

5. The network system of claim 1, wherein the on-demand application service controller is further configured to:
   send the validation request to a registry;
   receive from the registry in response the validation request an indication of whether the customer is responsible for the site;
   permit generation of the diversion routing control message, if the indication identifies the customer as being responsible for the site; and
   deny generation of the diversion routing control message, if the indication identifies the customer as not being responsible for the site.

6. An on-demand application service controller comprising:
   a processor; and
   a memory that stores instructions which, when executed by the processor, cause the processor to perform operations comprising
      receiving an on-demand service request for an application service, wherein the application service comprises a distributed denial of service mitigation service and the on-demand service request is received in response to a distributed denial of service attack,
      generating a validation request in response to receiving the on-demand service request, the validation request being used to validate a customer that provided the on-demand service request is responsible for a site for which the application service has been requested,
      generating a diversion routing control message in response to receiving the on-demand service request for the application service, the diversion routing control message comprising instructions for a provider edge router to divert ingress traffic from an intended destination to a distributed denial of service attack scrubber, implemented by an application server, for processing,
      generating a re-injection routing control message in response to receiving the on-demand service request for the application service, the re-injection routing control message comprising instruction for an application service provider edge router to deliver the ingress traffic processed by the distributed denial of service attack scrubber to the intended destination,
      sending the diversion routing control message to an ingress provider edge router, and
      sending the re-injection routing control message to the application service provider edge router.

7. The on-demand application service controller of claim 6, wherein the application service further comprises a uniform resource locator blocking service and the application server comprises a uniform resource locator scrubber.

8. The on-demand application service controller of claim 6, wherein the on-demand service request is received from a customer equipment located at a customer premises via an multi-hop external border gateway protocol message.

9. The on-demand application service controller of claim 6, wherein the on-demand service request is received from a customer service management client via one of a Web-based graphical user interface and a client/server application programing interface.

10. The on-demand application service controller of claim 6, wherein the application service is a pay-as-you-go service.

11. The on-demand application service controller of claim 6, wherein the application service is a subscription service.

12. The on-demand application service controller of claim 6, wherein the operations further comprise:
   sending the validation request to a registry;

receiving from the registry in response the validation request an indication of whether the customer is responsible for the site;

permitting generation of the diversion routing control message, if the indication identifies the customer as being responsible for the site; and denying generation of the diversion routing control message, if the indication identifies the customer as not being responsible for the site.

13. The on-demand application service controller of claim 6, wherein the instructions to receive the on-demand service request further comprise instructions to receive the on-demand service request from an attack monitor in response to the attack monitor detecting attack traffic directed to the intended destination.

14. A method for dynamic routing of internet protocol traffic, the method comprising:

receiving, at an on-demand application service controller, an on-demand service request for an application service, wherein the application service comprises a distributed denial of service mitigation service and the on-demand service request is received in response to a distributed denial of service attack;

generating, at the on-demand application service controller, a validation request in response to receiving the on-demand service request, the validation request being used to validate a customer that provided the on-demand service request is responsible for a site for which the application service has been requested;

generating, at the on-demand application service controller, a diversion routing control message in response to receiving the on-demand service request for the application service, the diversion routing control message comprising instructions for an ingress provider edge router to divert ingress traffic from an intended destination to a distributed denial of service attack scrubber, implemented by an application server, for processing;

generating, at the on-demand application service controller, a re-injection routing control message in response to receiving the on-demand service request for the application service, the re-injection routing control message comprising instructions for an application service provider edge router to deliver the ingress traffic processed by the distributed denial of service attack scrubber to the intended destination;

sending, at the on-demand application service controller, the diversion routing control message to the ingress provider edge router; and sending, at the on-demand application service controller, the re-injection routing control message to the application service provider edge router.

15. The method of claim 14, further comprising:

receiving, at the ingress provider edge router, the diversion routing control message from the on-demand application service controller;

receiving, at the ingress provider edge router, the ingress traffic directed to the intended destination;

redirecting, at the ingress provider edge router, the ingress traffic to the application service provider edge router; and routing, at the application service provider edge router, the ingress traffic to the destributed denial of service attack scrubber for processing in accordance with the application service.

16. The method of claim 15, further comprising:

receiving, at the application service provider edge router, the re-injection routing control message from the on-demand application service controller; and routing, at the application service provider edge router, post-processed traffic created by the distributed denial of service attack scrubber as a result of the distributed denial of service attack scrubber processing the ingress traffic in accordance with the application service to the intended destination.

17. The method of claim 16, wherein routing, at the application service provider edge router, the post-processed traffic to the intended destination comprises routing, at the application service provider edge router, the post-processed traffic to a customer provider edge router that is in communication with a customer equipment serving the intended destination.

18. The method of claim 14, further comprising:

sending, by the on-demand application service controller, the validation request to a registry;

receiving, at the on-demand application service controller, from the registry in response the validation request an indication of whether the customer is responsible for the site;

permitting, by the on-demand application service controller, generation of the diversion routing control message, if the indication identifies the customer as being responsible for the site; and denying, by the on-demand application service controller, generation of the diversion routing control message, if the indication identifies the customer as not being responsible for the site.

* * * * *